(12) United States Patent
Coffy et al.

(10) Patent No.: US 12,187,819 B1
(45) Date of Patent: Jan. 7, 2025

(54) COMPOUND, ITS PREPARATION AND USE

(71) Applicant: TPC Group LLC, Houston, TX (US)

(72) Inventors: Tim J. Coffy, Houston, TX (US); Wayne Ouellette, Missouri City, TX (US)

(73) Assignee: TPC Group, LLC, Houston, TX (US)

( * ) Notice: Subject to any disclaimer, the term of this patent is extended or adjusted under 35 U.S.C. 154(b) by 0 days.

(21) Appl. No.: 18/509,797

(22) Filed: Nov. 15, 2023

(51) Int. Cl.
| | |
|---|---|
| *C08F 110/10* | (2006.01) |
| *C06B 47/14* | (2006.01) |
| *C09D 123/36* | (2006.01) |
| *C09J 123/36* | (2006.01) |
| *C10L 1/236* | (2006.01) |
| *C10M 149/02* | (2006.01) |
| *C10M 169/04* | (2006.01) |
| *C10N 20/02* | (2006.01) |
| *C10N 20/04* | (2006.01) |
| *C10N 30/10* | (2006.01) |
| *C10N 40/25* | (2006.01) |

(52) U.S. Cl.
CPC .......... *C08F 110/10* (2013.01); *C06B 47/145* (2013.01); *C09D 123/36* (2013.01); *C09J 123/36* (2013.01); *C10L 1/236* (2013.01); *C10M 149/02* (2013.01); *C10M 169/041* (2013.01); *C08F 2810/40* (2013.01); *C10M 2203/003* (2013.01); *C10M 2217/06* (2013.01); *C10N 2020/02* (2013.01); *C10N 2020/04* (2013.01); *C10N 2030/10* (2013.01); *C10N 2040/25* (2013.01)

(58) Field of Classification Search
CPC ............... C08F 110/10; C08F 2810/40; C06B 47/145; C09D 123/36; C09J 123/36; C10L 1/236; C10M 149/02; C10M 169/041; C10M 2203/003; C10M 2217/06; C10N 2020/02; C10N 2020/04; C10N 2030/10; C10N 2040/25
See application file for complete search history.

(56) References Cited

U.S. PATENT DOCUMENTS

| | | |
|---|---|---|
| 3,794,586 A | 2/1974 | Kimura et al. |
| 3,850,822 A | 11/1974 | Steere et al. |
| 3,873,455 A | 3/1975 | Schieman |
| 4,402,841 A | 9/1983 | Schieman |
| 4,844,756 A | 7/1989 | Forsberg |
| 4,933,028 A | 6/1990 | Mullay et al. |
| 4,958,034 A | 9/1990 | Hale et al. |
| 5,021,169 A | 6/1991 | Shin et al. |
| 5,026,442 A | 6/1991 | Yabsley et al. |
| 5,160,387 A | 11/1992 | Sujansky |
| 5,241,003 A | 8/1993 | Degonia et al. |
| 5,326,921 A | 7/1994 | Chen |

(Continued)

*Primary Examiner* — Taiwo Oladapo
(74) *Attorney, Agent, or Firm* — M. Susan Spiering; Ochoa & Associates, P.C.

(57) ABSTRACT

The invention relates to a bis-polyisobutylene alcohol amine compound and compositions thereof. The invention also is directed to a new process for making the bis-polyisobutylene alcohol amine by reacting a polyisobutylene epoxide with a polyamine, optionally in the presence of a catalyst, a protic solvent initiator and/or a diluent. In addition, the invention further relates to the many uses of the bis-polyisobutylene alcohol amine including but not limited to its use in lubricants, surfactants, emulsifiers, resins, and the like.

66 Claims, 2 Drawing Sheets

GPC Characterization of bPIBAA.(logarithmic scale)

(56) References Cited

U.S. PATENT DOCUMENTS

| | | | |
|---|---|---|---|
| 5,360,564 A | 11/1994 | Sutherland et al. |
| 5,470,407 A | 11/1995 | Griffith et al. |
| 5,527,491 A | 6/1996 | Riga et al. |
| 5,670,739 A | 9/1997 | Patterson et al. |
| 5,920,031 A | 7/1999 | Jahnke |
| 5,936,194 A | 8/1999 | Marlow et al. |
| 5,942,476 A | 8/1999 | Campbell |
| 6,001,780 A | 12/1999 | Ho et al. |
| 6,165,297 A | 12/2000 | Smith et al. |
| 6,346,129 B1 | 2/2002 | Sabourin et al. |
| 6,497,736 B1 | 12/2002 | Sabourin |
| 6,514,361 B1 | 2/2003 | Borden |
| 6,551,967 B2 | 4/2003 | King et al. |
| 6,562,913 B1 | 5/2003 | Baxter, Jr. et al. |
| 6,686,321 B2 | 2/2004 | Boden et al. |
| 6,800,154 B1 | 10/2004 | Carey et al. |
| 6,844,300 B2 | 1/2005 | Milner et al. |
| 6,929,707 B2 | 8/2005 | Mullay et al. |
| 6,939,420 B2 | 9/2005 | Pollack |
| 6,951,589 B2 | 10/2005 | Pollack et al. |
| 7,044,988 B2 | 5/2006 | Filippini et al. |
| 7,339,007 B2 | 3/2008 | Irving et al. |
| 7,820,600 B2 | 10/2010 | Habeeb et al. |
| 7,851,418 B2 | 12/2010 | Habeeb et al. |
| 7,972,454 B2 | 7/2011 | O'Hara et al. |
| 7,998,340 B2 | 8/2011 | Wedlock |
| 8,163,682 B2 | 4/2012 | Stoehr et al. |
| 8,399,390 B2 | 3/2013 | Wu et al. |
| 8,524,843 B2 | 9/2013 | Shaikh et al. |
| 8,603,959 B2 | 12/2013 | Bevinakatti et al. |
| 8,691,738 B2 | 4/2014 | Baillargeon et al. |
| 8,946,361 B2 | 2/2015 | Shaikh et al. |
| 9,074,026 B2 | 7/2015 | Shaikh |
| 9,228,152 B2 | 1/2016 | Thompson et al. |
| 9,282,736 B2 | 3/2016 | Kostansek et al. |
| 9,309,339 B2 | 4/2016 | Shaikh |
| 9,315,761 B2 | 4/2016 | Patil et al. |
| 9,598,655 B2 | 3/2017 | Shaikh et al. |
| 9,617,363 B1 | 4/2017 | Kumar et al. |
| 9,783,630 B2 | 10/2017 | Stoehr et al. |
| 9,809,665 B2 | 11/2017 | Menschig et al. |
| 9,926,509 B2 | 3/2018 | Schilowitz et al. |
| 10,358,616 B2 | 7/2019 | Gahagan et al. |
| 10,494,584 B2 | 12/2019 | Mosier et al. |
| 10,611,981 B2 | 4/2020 | Abraham et al. |
| 10,640,724 B2 | 5/2020 | Strong et al. |
| 10,781,393 B2 | 9/2020 | Kahsar et al. |
| 10,781,411 B2 | 9/2020 | Bartley et al. |
| 10,793,802 B2 | 10/2020 | Abraham et al. |
| 10,808,196 B2 | 10/2020 | Lewis |
| 10,829,712 B2 | 11/2020 | Hartley |
| 11,034,912 B2 | 6/2021 | Ritchie et al. |
| 11,059,924 B2 | 7/2021 | Cattoz et al. |
| 11,136,523 B2 | 10/2021 | Hartley et al. |
| 11,326,004 B2 | 5/2022 | Kumar et al. |
| 11,346,643 B2 | 5/2022 | Nelson et al. |
| 11,427,515 B2 | 8/2022 | Halander et al. |
| 11,608,477 B1 | 3/2023 | Garelick et al. |
| 11,629,308 B2 | 4/2023 | Salvi et al. |
| 11,680,782 B2 | 6/2023 | Averett et al. |
| 11,685,872 B2 | 6/2023 | Hughes et al. |
| 11,732,208 B2 | 8/2023 | Barton et al. |
| 11,773,343 B2 | 10/2023 | Garelick et al. |
| 11,788,026 B2 | 10/2023 | Dyer et al. |
| 11,788,027 B2 | 10/2023 | Dvorak et al. |
| 2006/0063844 A1* | 3/2006 | Nagy .............. C08F 8/32 525/379 |
| 2014/0087983 A1* | 3/2014 | Patil .............. C10M 149/16 508/304 |
| 2023/0323234 A1 | 10/2023 | Loop et al. |

\* cited by examiner

GPC Characterization of bPIBAA.(logarithmic scale)

bPIBAA        PIBSI

COMPOUND, ITS PREPARATION AND USE

FIELD OF THE INVENTION

The invention relates to a new compound, its preparation and use. In particular the new compound is a novel polyisobutylene compound, specifically a bis-polyisobutylene alcohol amine and derivatives thereof. The invention also is directed to a new process for making the bis-polyisobutylene alcohol amine, derivatives and compositions thereof, and to its many uses in lubricants, surfactants, emulsifiers, resins, and the like.

BACKGROUND OF THE INVENTION

Polyisobutylene (PIB) is well known in art and produced typically by the polymerization of isobutylene in the presence of catalyst. PIB is a long chain molecule of various lengths of isobutylene molecules and have different number average molecular weight (Mn) and polydispersity index (PDI) that give selective properties such as viscosity.

Conventional PIB compounds and compositions having primarily internal unsaturation (double bond) tend to be less reactive primarily made from isobutylene and typically an aluminum based catalyst. There are also more reactive PIB compounds and compositions having a higher percentage of unsaturation, double bond, at the end of the PIB molecule primarily being made from more selective fluorine containing catalysts such as BF3.

It is well known that the variance in PIB compounds and compositions, the difference in unsaturation, more particularly the alpha vinylidene content, depends on the process conditions such as concentration of isobutylene, temperature, catalyst, and solvents used.

The reactivity of PIB determines in most cases its use and ultimately the performance of the final product in which it is used. Conventional PIB is used in for example, sealants, caulks, and adhesive, packaging and greases. The more reactive PIB is used primarily in lubricants and fuel additives, however, conventional PIB is also used. Other uses include sizings, oxirane derivatives, and use in rubber compositions.

PIB, preferably the more reactive PIB, is primarily used for making well known lubricants such as polyisobutylene succinic imide or polyisobutylene succinic amide (PIBSI). PIBSI is formed by reacting polyisobutylene succinic anhydrides (PIBSA) or polyisobutylene succinic acid, an intermediate to PIBSI, with a monoamine or polyamine, in particular a primary amine. PIB, being mostly non-polar, requires the reaction with for example maleic anhydride forming a polar group for enabling the reaction of a linking group, namely succinic anhydride to form PIBSA. This technology is well known in the art and described in numerous patents and publication including U.S. Pat. Nos. 7,339,007, and 9,315,761 which are herein fully incorporated by reference.

Most commercial PIBSI are made using a thermal process beginning with PIB having a relatively high proportion of terminal vinylidene bonds, referred to in the industry as "reactive or highly reactive" PIB's. High or medium reactive PIB's are well known in the art and are further described in U.S. Pat. Nos. 6,562,913 and 9,309,339, which is herein fully incorporated by reference. Conventional PIB typically has a relatively low content of terminal vinylidene bonds and usually requires in combination with polyisobutylene a halogen containing catalyst such as aluminum chloride, see for example U.S. Pat. No. 5,326,921.

The thermal and halogen-assisted reactions described above tend to produce significant amounts of haze, and highly colored sediment byproducts which must be filtered from the final product, PIBSI, prior to its use. The thermal process tends to produce tars during the reaction, which coat the reactor walls, necessitating frequent, time-consuming, and therefore costly clean-ups of the reactor vessel. Sediment and tar formation are believed to be due, at least in part, to the decomposition and/or polymerization of the unsaturated enophile, which is typically maleic anhydride. Efforts have been made to eliminate the haze and sediment produced as demonstrated by U.S. Pat. Nos. 7,339,007, 4,958, 034, 5,021,169 and 5,241,003.

Below is a structure of a PIBSI where the polyisobutylene portion is seen to retain unsaturation, a double bond. As a result of the retained unsaturation it contains highly reactive allylic hydrogens which is a source of unwanted reactivity.

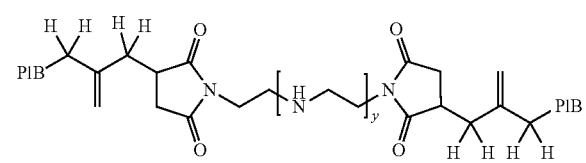

Representative in the PIBSI structure above, PIB is representative of the remainder of the polyisobutylene polymer and y is related to the specific polyamine used.

Thus, it would beneficial if a PIBSI or PIBSI-type compound could be made without the need for maleic anhydride and without retaining unsaturation that produce reactive allylic hydrogens all of which contribute to side reactions leading to poor color, haziness and sediment.

A second known chemistry for using PIB to make additives for use in similar applications as PIBSI, that does not use maleic anhydride as a linker for the amine, involves using polyisobutylene to produce a polyisobutylene epoxide. A monoamine or polyamine, specifically a primary amine, can then directly react with the strained three membered epoxide ring to form an amino alcohol, more specifically a polyisobutylene alcohol amine.

U.S. Pat. No. 3,794,586 is directed to lubricating oil compositions comprising the reaction between a polyolefin epoxide and an amine compound, including polyisobutylene epoxide to form the reaction product of mono-polyisobutylene hydroxyalkyl-substituted polyamine. U.S. Pat. Nos. 6,497,736 and 6,346,129 discloses fuel compositions containing mono-polyisobutylene hydroxyalkyl-substituted amines for use as automotive fuel detergents. In addition, Canadian Patent Application CA 2,856,684A1 describes an amine mixture of a mono-polyisobutylene amine and aliphatic amine for use in cleaning inlet valves and injection nozzles in engines.

While these mono-polyisobutylene alcohol amines are useful there is need to improve their solubility, reduce reactivity towards side-reactions, and other performance criteria in various applications especially as a fuel and motor oil lubricant or additive. Therefore, there is a need in the art for an improved compound or composition that provides for improved chemical and physical properties.

SUMMARY OF INVENTION

The invention is directed to a new compound(s) or composition, its manufacture and use. The novel product, a bis-polyisobutylene alcohol amine (referred to herein as bPIBAA), is represented by the following general formula:

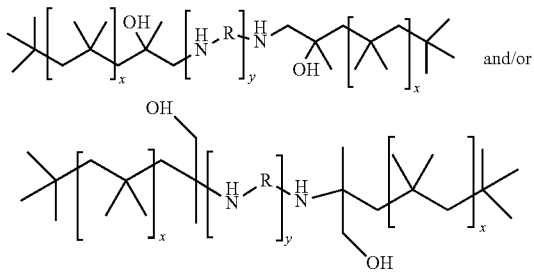

and/or wherein x is an integer from 1 to about 200, preferably 1 to about 150 and most preferably between 1 to 100, R is a $C_1$-$C_{10}$ branched, cyclic or straight chained alkylene group (or a combination of), and y is an integer between 1 to about 20, preferably about 1 to 15 and most preferably between 1 to 10. In one embodiment of the general formula above x is 100 and y is an integer from 1 to 10, and in another embodiment, x is 50 and y is 2 to 10. In yet another embodiment, of the general formula above x is an integer in the range of from 90 to 110 and y is an integer from 1 to 10, and in another embodiment, x is an integer in the range of from 40 to 60 and y is an integer from 2 to 10. In the most preferred embodiment R is ethylene.

The above bPIBAA compounds are made from reacting generally a polyisobutylene epoxide and a polyamine represented by the formula below:

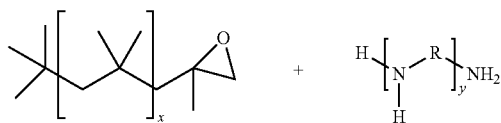

wherein x is an integer from 1 to about 200, preferably 1 to about 150 and most preferably between 1 to 100, R is a $C_1$-$C_{10}$ branched, cyclic or straight chained alkylene group (or a combination of), and y is an integer between 1 to about 20, preferably about 1 to 15 and most preferably between 1 to 10. In one embodiment of the general formula above x is 100 and y is an integer from 1 to 10, and in another embodiment, x is 50 and y is 2 to 10. In yet another embodiment, of the general formula above x is an integer in the range of from 90 to 110 and y is an integer from 1 to 10, and in another embodiment, x is an integer in the range of from 40 to 60 and y is an integer from 2 to 10.

The process for making the bPIBAA of the invention comprises reacting (a) a polyisobutylene epoxide (PIBEP) and a polyamine in the presence of a diluent and optionally a Lewis Acid or Bronsted Acid catalyst. In a preferred embodiment the polyisobutylene epoxide is selected from one or more of a Type 1, 2 or 3 polyisobutylene epoxide represented by the formula:

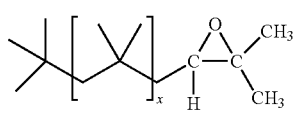

(1)

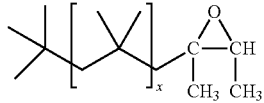

(2)

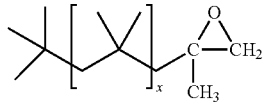

(3)

wherein x is an integer from 1 to about 200, preferably 1 to about 150 and most preferably between 1 to 100.

In a preferred embodiment the mole percent of Type 1, 2 and/or 3 polyisobutylene epoxide is used in an amount of at least 30 mol %, preferably at least 40 mol %, more preferably at least 50 mol %, even more preferably at least 60 mol %, and most preferably greater than 70 mol %. In another embodiment, the mole percent of Type 3 polyisobutylene epoxide is used in an amount of at least 50 mol % to about 60 mol %, preferably from about 65 mol % to about 70 mol %, most preferably greater than about 70 mol %. In another embodiment, the mole percent of Type 3 polyisobutylene epoxide is used in an amount of at least 70 mol % to about 80 mol %, preferably from about 80 mol % to 85 mol % to about 90 mol % to 95 mol %, most preferably greater than about 95 mol %. In another embodiment, the mole percent of Type 1 and 3 polyisobutylene epoxide is used in an amount of at least 85 mol % or greater up to about 98 mol %, and most preferably greater than about 90 mol % to 95 mol %.

In one embodiment a combination of Type 1, 2 and 3 polyisobutylene epoxides are used in the process of the invention for making bPIBAA. In one preferred embodiment, more than 70 mol %, preferably greater than 80 mol % or even 90 mol % of the polyisobutylene epoxide of Type 3 is used.

The polyamine useful in reacting with the polyisobutylene epoxide can be any amine, preferably a monoamine or a polyamine, more preferably a polyamine. In one embodiment, the polyamine is represented by the formula:

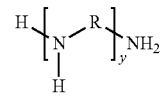

wherein R is a $C_1$-$C_{10}$ branched, cyclic or straight chained alkylene group (or a combination of), and y is an integer between 1 to about 20, preferably about 1 to 15 and most preferably between 1 to 10 inclusive. In one embodiment, the preferred polyamines include but are not limited to methylene polyamines, ethylene polyamines, butylene polyamines, propylene polyamines, pentylene polyamines, etc., aromatic polyamines, cyclic polyamines such as piperazines and N-aminoalkyl substituted piperazines, and the like. Specific non-limiting representative examples of such polyamines also include ethylene diamine, diethylene triamine, triethylene tetramine, tris-(2-aminoethyl)-amine, propylene diamine, trimethylene diamine, tripropylaminetetramine, tetraethylenepentamine, and heptaethylenehexamine. Amines may be pure or mixtures, such a mixture is exemplified by the commercial Ethyleneamine E-100 produced by Huntsman Corporation, The Woodlands, TX.

Other amine compounds useful in the invention could be ethoxylated amines such as ethanol amine, and the like.

In a preferred embodiment at least one diluent is used optionally in the reaction between the polyisobutylene epoxide and the polyamine to improve, among other things the solubility and mixing in the process. In an embodiment, at least one diluent is selected from one or more of benzene, toluene, xylenes; saturated aliphatic hydrocarbons such as pentane, hexane, heptane; paraffinic, naphthenic, aromatic base oils for example well known from Group I, Group II, Group III, Group IV or Group V including poly-alpha olefins or any other compound useful for affecting reaction viscosity.

In another embodiment, optionally, a Lewis acid or a Bronsted acid catalyst may be used and selected form one or more of: trichloroaluminium, trifluoroboron, tetrachlorotitanium, ferric chloride; BF3:ether, BF3:alcohol; or a solid catalyst containing a moiety of Lewis acid and Bronsted acid such as silica, silica-alumina or an organic acid and water.

In another preferred embodiment, at least one protic solvent initiator is used in the reaction between the polyisobutylene epoxide, the polyamine and the protic solvent initiator, without or without a catalyst. In one embodiment, the at least one initiator is preferably at least one organic hydroxyl compound, preferably an alcohol or water, and most preferably an alcohol such as methanol or ethanol.

The temperature for the above process is typically below the depolymerization temperature of the polyisobutylene epoxide. Such non-limiting reaction temperature is generally from about 60° C. to about 260° C., more generally from about 100° C. to about 240° C., desirably from about 150° C. to about 230° C., and most preferably from about 180° C. to about 225° C. Depending on the process, temperatures can be even lower depending on the catalyst and reaction process used.

The process reaction can either be run in an open vessel under atmospheric conditions, or in a closed vessel under moderate pressure, with non-limiting pressures up to about 300 psi, desirably from about 10 psi to about 70 psi, and preferably from about 35 psi to about 55 psi. Reaction pressure will be a function of the partial pressures of the individual reaction components at the reaction temperature.

The reaction to produce bPIBAA often results in a bPIBAA composition in which predominantly, more than 50 mol %, preferably more than 60 mol %, more preferably greater than 70 mol %, and even more preferably greater than 80 mol % and most preferably more than 90 mol % of the composition is bPIBAA. Minor components present in the composition may include mixtures of isomers from the polyamine, unreacted polyisobutylene epoxide and byproducts from the initial epoxidation of isobutylene such as mainly alcohols, aldehydes, unreacted polyisobutylene), and very small quantities, if any detectable, of mono-substituted poly-isobutyl alcohol amine in an amount making up less than 2 mol %, typically less than 1 mol % to 0, not detectable, in the bPIBAA composition.

It has surprisingly been discovered that among other findings, that controlling the mole ratio of polyisobutylene to polyamine the percentage of minor components is reduced or virtually eliminated. The reaction of the polyisobutylene epoxide and the polyamine described above leading to the production of bPIBAA was discovered using in one embodiment a mole ratio of polyamine to isobutylene epoxide of less than 1:1, preferably less than 0.9:1 and more preferably 0.8:1, and even more preferably 0.7:1, and still even more preferably from less than 0.6:1, or 0.5:1 or less. In another preferred embodiment molar ratio between polyamine and the isobutylene epoxide is in the range of from less than 1:1 to 0.2:1, more preferably 0.9:1 to 0.2:1, even more preferably from 0.8:1 to 0.2:1, and still more preferably from 0.7:1 to 0.2:1, and yet even still more preferably from 0.6:1 to 0.3:1, and most preferably from 0.5:1 to 0.2:1.

In another embodiment, the mole ratio of polyamine to polyisobutylene epoxide is such that a little to a slight excess of polyisobutylene epoxide is used. In another embodiment, the preferred mole ratio for polyamine to polyisobutylene epoxide is such that for every mole of polyamine used at least two moles of polyisobutylene epoxide is used.

In one preferred embodiment, the invention is directed to a process for making a bPIBAA composition, the process comprising the steps of:
   (a) contacting in a reactor a polyisobutylene epoxide and a polyamine in a mole ratio of polyamine to polyisobutylene epoxide of less than 0.9:1;
   (b) optionally introducing a diluent;
   (c) optionally adding a catalyst to the reactor; and
   (d) adding a protic solvent initiator to the reactor; wherein the bPIBAA composition comprises greater than 50 mole percent (50 mol %) bPIBAA.

In the above process in another embodiment, when the polyamine to polyisobutylene epoxide is less than 0.6:1, the bPIBAA composition comprises greater than 70 mol %, preferably greater than 80 mol % bPIBAA. In yet another embodiment, when the polyamine to polyisobutylene epoxide is less than 0.5:1, the bPIBAA composition comprises greater than 90 mol %, preferably greater than 95 mol % bPIBAA.

In the above process, the preferred polyisobutylene epoxide is preferably predominantly a Type 3 polyisobutylene epoxide, the polyamine is tetraethylenepentamine, or heptaethylenehexamine or a mixture such is exemplified by the commercial Ethyleneamine E-100 produced by Huntsman Corporation, The Woodlands, TX, and the mole ratio between the polyamine and the polyisobutylene epoxide is less than 1:1, preferably less than 0.8:1, more preferably less than 0.6:1, and most preferably less than 0.5:1.

The bPIBAA of the invention has numerous benefits over mono-poly-isobutyl alcohol amine, and with respect to PIBSI advantages including improved color, minimal haze/sediment during the reaction, the final product has no or predominantly no unsaturation which eliminates the allylic hydrogens present in PIBSI. It has also been found that in some instances the bPIBAA of the invention has a significantly lower viscosity (KV100) as compared to viscosity of a similar PIBSI. It has also been surprisingly discovered that a lubricating oil containing in some instances the bPIBAA of the invention used as or in a dispersant exhibits significantly better oxidation resistance as compared to oxidation resistance of the same lubricating oil containing PIBSI as a dispersant on an equal weight percent basis as measured by gain in viscosity (KV40). The bPIBAA of the invention is also useful as an emulsifier for use in an oil/water emulsion in for example paints or coatings, even in an explosive emulsion composition given its higher oxidative stability versus conventional PIBSA or PIBSI.

DESCRIPTION OF THE DRAWINGS

The present disclosure is illustrated by way of example, and not by way of limitation, in the accompanying drawings, in which like reference characters refer to like parts throughout, and in which.

Figure 1:
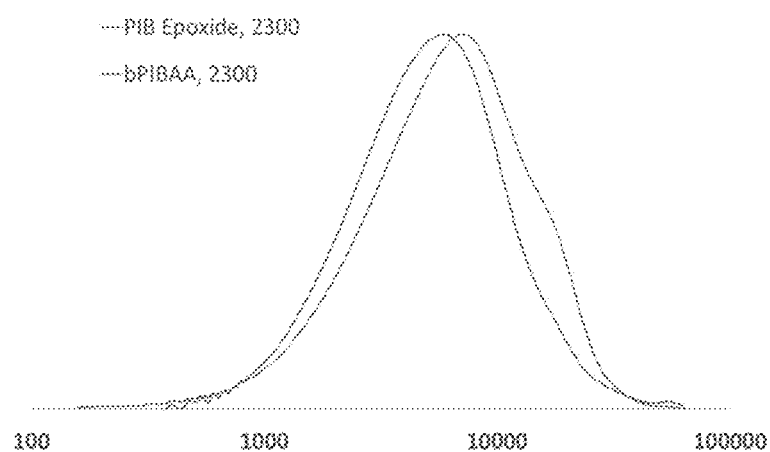
FIG. 1 illustrates a GPC characterization of bPIBAA on a logarithmic scale.

While the disclosed process and composition are susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF EMBODIMENTS

Disclosed herein is a new compound namely bis-Polyisobutylene Alcohol Amine (bPIBAA), and the reaction for making bPIBAA from polyisobutylene epoxides (PIBEP) with a polyfunctional amine, and to the many uses for bPIBAA.

Polyisobutylene and Making the Polyisobutylene Epoxide.

The polyisobutylene epoxide of the presently employed bPIBAA reaction product is obtained by oxidizing a polyalkene with an oxidizing agent to give an alkylene oxide, or epoxide, in which the oxirane ring is derived from oxidation of the double bond in the polyalkene. A preferred polyalkene is polyisobutylene.

Polyisobutylene.

Polyisobutylene (PIB) is a long chain molecule synthesized by polymerizing or linking isobutylene molecules. There are many processes well known in the art for making PIB including but not limited to U.S. Pat. Nos. 9,598,655, 9,617,363, 9,309,339, 6,562, 913, 8,524,843, 8,946,361, 11,326,004, 9,074,026 and 9,809,665 and EP1381637B2, which are all fully incorporated by reference.

PIB comes in many forms with a wide range of molecular weights from a few hundred to a few million, typically the preferred use number average molecular weight (Mn) is in the range of from 100 to 5000, preferably 400 to 4000 and most preferably around 500 to about 3500 or less. In addition, PIB as a result of the differing chain lengths also having a wide range of polydispersity index (PDI), measured by GPC using polyisobutylene standards, typically in the range of from about 1.3 to less than 5, more preferably from about 1.4 to less than 4, and most preferably from about 1.5 to less than 3. Together the Mn and PDI are key properties for determining useful PIB viscosities and flash points for specific uses.

PIB is available from many commercial manufactures such as TPC Group, INEOS Oligomers, Infineum, Lubrizol and BASF, each supplying various combinations of low, medium and highly reactive PIB such as GLISSOPAL® and OPPANOL® from BASF Corporation, Ludwigshafen, Germany, Indopol® products available from INEOS Oligomers, London, UK, LUBRIZOL 3108 available from The Lubrizol Corporation, Wickliffe Ohio.

Various types of PIB are available from TPC Group, Houston, TX including highly reactive PIB (HR-PIB) such as HR 545, HR595 and HR 5230, medium reactive PIB (LM-PIB) such as TPC 175 and TPC 1160 and di-isobutylene (DIB) and triisobutylene (TIB).

The determining factor for differentiating between medium and highly reactive PIB is the degree of polymerization based on the concentration of various double bond end group types, i.e., alpha, beta, tetrasubstituted, trisubstituted, and substituted alpha among others. The difference between the PIB can be determined by measuring the PIB alpha-vinylidene content. Conventional or low to medium have between 0 and 10% alpha-vinylidene isobutylene isomer content, whereas highly reactive PIB has between 60% to 90% or greater alpha-vinylidene isobutylene isomer content.

Surprisingly, it has been further found that the bPIBAA of the invention can be made using conventional or highly reactive PIB as the starting monomer for making the polyisobutylene epoxide. In one embodiment, a highly reactive PIB is preferred in the process for making the polyisobutylene epoxide starting monomer in the process of the invention to be reacted with a polyamine.

Epoxidation of Alkenes and Other Polymers

Epoxidation of a broad variety of alkenes, including polymers with double bonds, is in general known in the art. Representative prior art showing various procedures for epoxidizing a number of types of unsaturated materials pp. 82-86 (2005); Song et al., J. Polym. Sci. Polym. Chem. Vol. 40, pp. 1484-1497 (2002); Shigenobu et al. (Maruzen Petrochemical); JP Patent Application No. JP2001 031716A, published Feb. 26, 2001; Suzuki et al., Journal of Applied Polymer Science, Vol. 72, pp. 103-108 (1999); and Li et al.: Macromolecules, Vol. 38, pp. 6767-6769 (2005). Epoxidation of non-polymeric materials using catalysts or selected reaction medium solvents is also in general known in the art. Representative prior art references showing these kinds of epoxidation includes Hellmann et al., Angew Chem. Int. Ed. Engl. Vol. 30, No. 12, pp. 1638-1641 (1991); Van Vliet et al., Chem. Commun., pp. 821-822, (1999); and Neimann et al., Org. Letters, Vol. 2, No. 18, pp. 2861-2863 (2000). includes Hafren et al., Macromol. Rapid Commun., Vol. 26, Examples of different types of intermediate polyisobutylene epoxides which are produced according to the present invention are set forth in the following by the following reaction illustrations, referred throughout as Type 1, 2 or 3 polybutylene epoxides represented below:

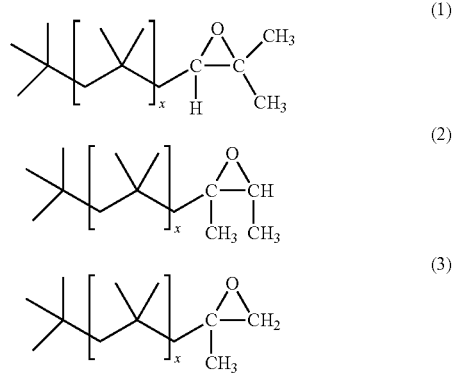

wherein x is from 1 to about 200, preferably 1 to about 100 and most preferably between 1 to 50, and content of polyisobutylene epoxide species bearing Type 1, 2 and/or 3 polyisobutylene epoxides of at least 50 mol %, more preferably 60 mol % and most preferably 80 mol % or greater.

In one embodiment of the general formula above x is 100 and y is an integer from 1 to 10, and in another embodiment, x is 50 and y is 2 to 10. In yet another embodiment, of the general formula above x is an integer in the range of from 90 to 110 and y is an integer from 1 to 10, and in another embodiment, x is an integer in the range of from 40 to 60 and y is an integer from 2 to 10. It is generally believed that Type 3 epoxides possess high reactivity toward amination, these polyisobutylene epoxides are preferred. However, it has been surprisingly found that epoxides of Type 1 and Type 2 also exhibit reactivity toward amination. Therefore, polyisobutylene epoxides that contain higher amounts of Type 1 and Type 2 epoxy groups are also useful in the present invention. In any case, if Type 3 epoxides are desired, they are produced starting with polyisobutylene containing high concentrations of Type 3 double bonds (shown above).

In yet another embodiment, the polyisobutylene epoxide (PIBEP) having a number average molecular weight (Mn) in the range of 400 to 5000 and an oxirane oxygen value of 2% to 0.15%, and preferably a Mn in the range of from 400 to 3500 and an oxirane oxygen value of 2% to 0.22%. and more preferably a Mn in the range of from 400 to 3000 and an oxirane oxygen value of 2% to 0.25%.

An example of such a commercially available polyisobutylene containing a high concentration of Type 3 double bonds is TPC 5230, TPC 545, and TPC 595 produced and available from the TPC Group Houston, Texas. Non-limiting examples of polyisobutylene containing a low amount of Type 3 double bonds but elevated levels of Type 1 and Type 2 double bonds are Indopol H-100, H-300, H-1200, H-1500, H-1900, H-2100, H-6000 and H-18000 produced by INEOS Oligomers, London, UK.

Type 4 tetra-polyisobutylene epoxide is present as a result of the process for making polyisobutylene epoxide and is present with all other Types 1, 2 and 3 in various amounts. For example, Type 4 is present in highly reactive polyisobutylene epoxide, a Type 3, in an amount of about 1 to less than 5 mol %, more likely between 1 mol % to less than 3 mol %, and in a low to medium reactivity polyisobutylene epoxide, a Type 1 and 2, Type 4 is believed present in an amount of between 25 mol % to 40 mol % or higher, more likely about 30 mol % to about 40 mol %.

Polyamines

In a subsequent step of the process, the epoxy ring of one or more of the above polyisobutylene epoxides is opened by the amine compound to form the direct bPIBAA compound or composition. It is believed that the amine compound, the polyamine, can be a primary amine or a secondary amine compound but preferably not a tertiary amine compound. Specifically, preferred in the process is the reaction with a primary amine group(s) of a diamine, or a polyamine. The amine compounds having two or more amine groups useful in the process for making the bPIBAA compound or composition of the invention include various diamines, polyamines, cyclic diamines, cyclic polyamines, alkylene diamines and alkylene polyamines of the general formula:

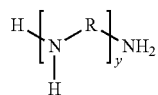

R is a $C_1$-$C_{10}$ branched, cyclic or straight chained alkylene group (or a combination of), and y is an integer between 1 to 20, preferably 1 to 15 and most preferably between 1 to 10. Examples of amine compounds include methylene polyamines, ethylene polyamines, butylene polyamines, propylene polyamines, pentylene polyamines, etc., aromatic polyamines, cyclic polyamines such as piperazines and N-aminoalkyl substituted piperazines for example aminoethylpiperazine (AEP), and aminoethanolamine (AEEA), and the like. Specific non-limiting representative examples of such amine compounds also include ethylene diamine (EDA), diethylene triamine DETA), triethylene tetramine (TETA), tris-(2-aminoethyl)-amine, propylene diamine, trimethylene diamine, tripropylaminetetramine, tetraethylenepentamine, and heptaethylenehexamine; and other specific non-limiting representative examples of such polyamines also include ethylene diamine, diethylene triamine, triethylene tetramine, tris-(2-aminoethyl)-amine, propylene diamine, trimethylene diamine, tripropylaminetetramine, tetraethylenepentamine, and heptaethylenehexamine.

Amines compounds may be pure or mixtures, such a mixture is exemplified by the commercial amine, Ethyleneamine E-100 (E-100) produced by Huntsman Corporation, Woodland, Texas. Other amine compounds useful in the invention could be ethoxylated amines such as ethanol amines, and the like.

Other amine compounds that may be useful in the present invention are polyetheramines that include JEFFAMINE® D-230 and JEFFAMINE® D-400 as non-limiting examples, available from Huntsman Corporation, Woodlands, TX. These polyetheramines are represented by the general formula:

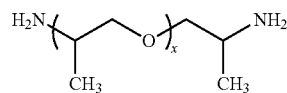

wherein x is 2.5 for D-230 and x is 6.1 for D-400.

In accordance with the invention, exemplary other amines compounds include polyetheramines and can be amine-terminated polyether's such as polyethylene oxide (PEO), polypropylene oxide (PPO) or combination of PEO/PPO copolymers. For example, some of the commercial polyether's include: poly(ethyleneglycol) bis(3-aminopropylether) poly(propyleneglycol) bis(2-aminopropylether) poly(propyleneglycol) bis(2-aminopropylether), poly(propyleneglycol) bis(2-aminopropylether), poly(propyleneglycol) bis(2-aminopropylether) poly(propyleneglycol)-block-poly(ethyleneglycol)-block poly(propyleneglycol) bis(2-aminopropylether) (3.5:8.5, PO:EO) poly(propyleneglycol)-block-poly(ethyleneglycol)-block poly(propyleneglycol) bis(2-aminopropylether) (3.5:15.5, PO:EO) poly(propyleneglycol)-block-poly(ethyleneglycol)-block poly(propyleneglycol) bis(2-aminopropylether) (3.5:40.5, PO:EO) glycerol tris(poly(propylene glycol), amine terminated ether poly(tetrahydrofuran), bis(3-aminopropyl) terminated, and the like.

In one embodiment a mole ratio of polyamine to polyisobutylene epoxide of less than 1:1, preferably less than 0.9:1 and more preferably 0.8:1, and even more preferably 0.7:1, and still even more preferably from less than 0.6:1, or 0.5:1 or less. In another preferred embodiment molar ratio between polyamine and the isobutylene epoxide is in the range of from less than 1:1 to 0.2:1, more preferably 0.9:1 to 0.2:1, even more preferably from 0.8:1 to 0.2:1, and still more preferably from 0.7:1 to 0.2:1, and yet even still more preferably from 0.6:1 to 0.3:1, and most preferably from 0.5:1 to 0.2:1.

In another embodiment, the mole ratio of polyamine to polyisobutylene epoxide is such that a little to a slight excess of polyisobutylene epoxide is used. In another embodiment, the preferred mole ratio for polyamine to polyisobutylene epoxide is such that for every mole of polyamine used at least two moles of polyisobutylene epoxide is used.

Diluent

Due to the high viscosity of the polyisobutylene epoxide the amination reaction is desirably carried out in the presence of at least one hydrocarbon diluent. It is believed that when the viscosity is too high the reactive sites are less accessible, and it is difficult for the desired reactant to diffuse to the reactive site.

The desired diluent should be stable and unreactive toward the reactants and the resulting end product, the bPIBAA. In an embodiment, at least one diluent is selected from one or more of benzene, toluene, xylenes; saturated aliphatic hydrocarbons such as pentane, hexane, heptane; paraffinic, naphthenic, aromatic base oils for example well known from Group I, Group II, Group III, Group IV or Group V including poly-alpha olefins or any other compound useful for affecting reaction viscosity.

The most preferred diluents are those that are easily removed from the final product (toluene, heptane, etc.) or those that can be left in the final mixture (i.e., base oil or PAO).

Catalyst

Optionally, although preferable, a catalyst may be used in the inventive process to accelerate the rate of reaction and improve overall conversion to bPIBAA product and composition. Such catalysts are well known in the art and used depending on the process, reactor configuration, reaction conditions, monomers, etc. Non-limiting examples of a suitable catalyst include a Lewis acid such as trichloroaluminium, trifluoroboron, tetrachlorotitanium, ferric chloride either alone or as a base adduct, such as $BF_3$:ether, $BF_3$:alcohol, etc., or a solid catalyst containing a moiety of Lewis acid and Bronsted acid such as silica, silica-alumina, and also an organic acid and water such as acetic acid and water may be used.

The amount of the catalyst is generally from about 0.05 to about 10 weight percent, and preferably from about 0.1 to about 10 weight percent based upon the total weight of the polyalkene epoxide. The most preferred catalyst is a Lewis acid such as boron trifluoride.

Initiator

In practice, the catalyst is used in combination with a protic solvent initiator or alone. In another embodiment, at least one protic solvent initiator is used in the reaction between the polyisobutylene epoxide, the polyamine and the diluent, with or without, a catalyst. In one embodiment, the at least one initiator is preferably at least one organic hydroxyl compound, preferably an alcohol or water, and most preferably an alcohol such as methanol or ethanol. The typical amounts of the protic solvent initiator used is less than 1 weight percent based on the weight of polyisobutylene epoxide.

Reactor and Conditions

Depending on the reactor type and configuration the reaction conditions may vary as is well known to one of skill in the art. In one embodiment, the batch process for producing the bPIBAA in which in a reactor, preferably jacketed, heated and agitated reactor to a specified temperature and pressure, PIBEP is introduced to the reactor in the presence of a diluent if used, followed by the introduction of a polyamine along with a catalyst if used in combination with a protic solvent initiator or separately from the initiator.

In one embodiment, it may be necessary to perform one or more of the steps of: removing the diluent, neutralizing and removing the catalyst, filtering or washing the rection product as synthesized in the reactor. In another embodiment, the diluent is a base oil, and therefore, the reaction product could be used as is. In one embodiment, the polyamine is introduced into the reactor in a staged manner during the reaction process.

The temperature of the reactor and contents must be below the depolymerization temperature of the epoxidized polyalkene, the polyisobutylene epoxide. Such reaction temperature is generally from about 60° C. to about 260° C., more generally from about 100° C. to about 240° C. and desirably from about 150° C. to about 230° C. and preferably from about 180° C. to about 225° C.

The reaction can either be run in an open vessel under atmospheric conditions, or in a closed vessel under moderate pressure such as up to about 300 psi, desirably from about 10 psi to about 70 psi, and preferably from about 35 psi to about 55 psi. Reaction pressure will be a function of the partial pressures of the individual reaction components at the reaction temperature.

Bis-Polyisobutylene Amino Alcohol Compound and Compositions

The novel product produced by the process as described above, a bis-polyisobutylene amino alcohol (referred to herein as bPIBAA), is represented by the following general formula:

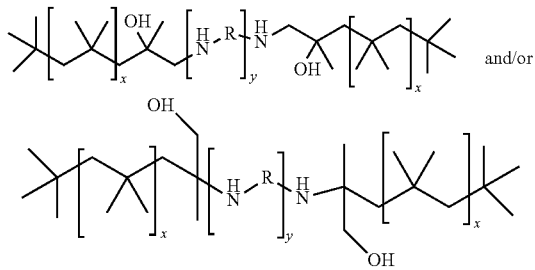

and/or wherein x is an integer from 1 to about 200, preferably 1 to about 150 and most preferably between 1 to 100, R is a $C_1$-$C_{10}$ branched, cyclic or straight chained alkylene group (or a combination of), and y is an integer between 1 to about 20, preferably about 1 to 15 and most preferably between 1 to 10. In one embodiment of the general formula above x is 100 and y is an integer from 1 to 10, and in another embodiment, x is 50 and y is 2 to 10. In yet another embodiment, of the general formula above x is an integer in the range of from 90 to 110 and y is an integer from 1 to 10, and in another embodiment, x is an integer in the range of from 40 to 60 and y is an integer from 2 to 10.

In another embodiment the bPIBAA composition comprises the bPIBAA compound(s) above in a percentage above 50 mol % based on the bPIBAA composition, more preferably above 60 mol % even more preferably greater than 70%, and most preferably greater than 80 mol %.

In another embodiment, the reaction to produce bPIBAA often results in a bPIBAA composition in which predominantly, more than 55 mol %, preferably more than 65 mol %, more preferably greater than 75 mol %, and even more preferably greater than 85 mol %, still even more preferably more than 95 mol %, of the composition is bPIBAA. Minor components present in the composition may include mixtures of isomers from the polyamine, unreacted polyisobutylene epoxide and byproducts from the initial epoxidation of isobutylene such as mainly alcohols, aldehydes, unreacted polyisobutylene), and very small quantities, if any detectable, of mono poly-isobutyl alcohol amine in an amount making up less than 2 mol %, typically less than 1 mol % to 0, not detectable, in the bPIBAA composition.

In one embodiment, the bPIBAA composition of the invention is free from mono-substituted poly-isobutyl alcohol amine.

In one embodiment, the bPIBAA composition comprises: (i) 5 to 98 mol % of one or more bis-polyisobutylene alcohol amine compound(s), (ii) up to 15 mol % of unreacted polyisobutylene, and (iii) up to 15 mol % one or more unreacted polyisobutylene epoxide, wherein the sum of the mol % of i, ii and iii together add to between 98 mol % and 100 mol %.

In one embodiment, the bPIBAA composition comprises: (i) 5 mol % to 98 mol % bPIBAA, preferably more than 60 mol %, even more preferably more than 70 mol %, and yet even more preferably more than 80 mol %, and especially more than 85 mol % or greater than 90 mol %, (ii) up to 15 mol % unreacted polyisobutylene, preferably less than 10 mol %, more preferably less than 5 mol %, (iii) up to 15 mol % unreacted polyisobutylene epoxide and/or side-products such as polyisobutylene alcohol, preferably less than 10 mol %, more preferably less than 5 mol %, and (iv) preferably less 2 mol % of mono-PIB, more preferably less than 1 mol %, wherein the sum of the mol % from i, ii, iii and iv together add to 100 mol %.

In one embodiment the bPIBAA compositions have a number average molecular weight (Mn) in the range of from 800 to 10,000, preferably from 800 to 8000, more preferably from 800 to 7000, and most preferably from 800 to 6000.

In another embodiment the bPIBAA compositions have a polydispersity index (PDI) in the range of from 1.2 to 5, preferably from 1.2 to 4, more preferably from 1.2 to 3.5, and most preferably from 1.2 to 3.

In yet another aspect of the bPIBAA compositions have a viscosity using ASTM D-445 at 100° C. in the range of from 10 cSt to 10,000 cSt, preferably from 15 cSt to 8000 cSt, more preferably from 20 cSt to 6000 cSt, and most preferably from 25 cSt to 5000 cSt.

The bPIBAA composition has any one or more of the above embodiments or aspects in any combination of Mn, PDI, and/or viscosity.

In another embodiment, the bPIBAA compound(s) or composition have a Mn in the range of from 800 to 6000, a PDI in the range of from 1.2 to 3, and a viscosity in the range of from 25 cSt to 5000 cSt.

In another embodiment, bPIBAA composition of the invention especially where a Type 1 and/or Type 2 is the predominant polyisobutylene epoxide used in forming the bPIBAA compound(s), the bPIBAA composition comprises an amount of fluorine or chlorine of not more than 10 ppm, preferably less than 5 ppm, more preferably less than 2 ppm, most preferably less than 1 ppm down to 0.

Uses of the bPIBAA

The bPIBAA composition is useful as an emulsifier, stabilizer, corrosion inhibitor, and dispersant in the formulation of various lubricants, fuels, and water-based fluids.

In particular the bPIBAA composition is useful as a dispersant additive in a motor oil lubricant formulation and as a fuel additive formulation. It may also be useful to improve the strength and durability of products such as adhesives, sealants, oils, greases.

The bPIBAA composition is useful as dispersant additives when employed in lubricating oils. The lubricating oil used with the bPIBAA compositions of this invention may be mineral oil or synthetic oils of lubricating viscosity and preferably suitable for use in the crankcase of an internal combustion engine. The lubricating oils may be derived from synthetic or natural sources. Mineral oil for use as the base oil in this invention includes paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha olefins having the proper viscosity.

Lubricating oil concentrates as uses for the disclosed bPIBAA are also included within the scope of this invention. The concentrates of this invention usually include from about 90 to 50 weight percent of an oil of lubricating viscosity and from about 10 to 50 weight percent of the bPIBAA of this invention. Typically, the concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions.

Other additives which may be present in the formulation include rust inhibitors, foam inhibitors, corrosion inhibitors, metal deactivators, pour point depressants, antioxidants, and a variety of other well-known additives and other uses including in adhesive, sealants, greases, emulsifiers, paints and coatings, and polymer formulations.

In one embodiment, the oxidative stability as measured in CEC-L48-00 using the percent change in viscosity measured by KV40 (ASTM D-445 at 40° C.) for the bPIBAA (only) composition in a base oil is less than 1000%, more preferably less than 800%, even more preferably less than 600%, and most preferably less than 400%. The base oil typically makes up greater than 40%, preferably greater than 50%, more preferably greater than of a Group I, Group II, Group III, Group IV, and Group V as defined by The American Petroleum Institute including their current standards for passenger and standard gasoline engine oils, diesel engines and marine based oils, which is fully incorporated herein by reference. The bPIBAA composition in combination with a Group I to V base oil where the bPIBAA composition has a Mn of from 800 to 8000, preferably from 800 to 6000, more preferably from 800 to 5000.

In one aspect the invention is directed to the use of the lubricating composition for improving fuel economy and/or wear protection in a gasoline or diesel engine, wherein the lubricating composition comprises from 1 to 20 weight percent of a bPIBAA compound(s) or composition having a Mn from 800 to 10000.

The lubricating composition above may further comprise an ashless dispersant, a borated ashless dispersant, a non-borated ashless dispersant, a detergent, i.e., calcium salicylate, calcium sulfonate, magnesium phenate. and calcium phenate, or other typical components well known in the relevant art.

In one embodiment, the preferred KV40 for the bPIBAA oil formulation is such that the increase in KV40(1) compared with KV40(2) is less than 500%, preferably less than 300% and most preferably less than 200% based on the KV40(1) using the CEC L-48-00 testing methodology. The bPIBAA compounds(s) or composition in the oil formulation comprises from 1 weight percent to 30 weight percent of a base oil, preferably from 2 wt. % to 25 wt. %, more preferably from 2 wt. % to 20 wt. %, and most preferably from 3 wt. % to 15 wt. %.

Formulations for use in dispersants, lubricants, greases, corrosion inhibitors, gear oils, base stocks are found in US Patent and Publication Nos.: U.S. Pat. Nos. 11,629,308, 10,808,196, 9,926,509, 7,851,418, 8,691,738, 8,399,390, 3,850,822, 11,788,027, 11,773,343, 9,228,152, 9,282,736, 6,844,300, 9,783,630, 7,998,340, 7,820,600, 8,163,682, 6,551,967, 6,001,780, 6,686,321, 5,942,476, 5,360,564, 4,402,841, 3,873,455 and 3,850,822, 10,494,584, 11,732, 208, US2023/0323234AA, U.S. Pat. Nos. 10,793,802, 10,781,411, 10,611,981, 10,358,616, 11,685,872. 11,059, 924, 10,829,712, 11,136,523, 10,781,393, 10,640,724, 11,346,643, 11,680,782, 11,034,912, 11,427,515, 11,788, 027, 11,788,026, and 11,608,477, which are all fully incorporated by reference such that one of ordinary skill in the art would consider replacing one or more components in the above formulations in particular those components functioning similarly to PIBSI or other polymers useful in a lubricating oil formulation.

It is also an aspect of this invention that a lubricant composition comprises a bPIBAA compound(s) or composition and a PIBSI or other useful polymer such as alpha-olefin oligomer including an ethylene oligomer or propylene oligomer as described in U.S. Pat. No. 9,315,761, which is herein fully incorporated by reference.

In one embodiment, the invention is directed to a lubricating composition for an automotive gear, axle and/or bearing comprising an oil of a lubricating viscosity, the oil comprising a bPIBAA compound(s) or composition, optionally a detergent and/or a borated dispersant.

In an embodiment, the invention is directed to a low, medium and high viscosity lubricating composition comprising: (a) an oil having a viscosity KV (100° C.) from 2 cSt to 100 cSt, from 2 cSt to 50 cSt, from 2 cSt to 30 cSt, from 2 cSt to 10 cSt one or more detergents, a bPIBAA composition or compound(s) from 1 to 30%, and/or the lubricating composition has a dynamic viscosity typically in the range of from 1.8 cP to 90 cP, from 1.8 cP to 45 cP, from 1.8 cP to 27 cP, 1.8 cP to 9 cP as measured using ASTM D-455 where the KV (100° C.) at values are divided by the density of the lubricating composition.

In one aspect of the invention is directed to combustible composition for cleaning a fuel delivery system, intake systems and combustion chambers, wherein the combustible composition comprises one or more bPIBAA compound(s) or composition(s) in an amount up to 40 weight percent based on the total weight of the combustible composition.

In another aspect of the invention is directed to a lubricating composition, the lubricating composition comprises bPIBAA compound(s) or composition(s) and two or more of a base oil, an ashless dispersant, an antioxidant, a detergent, and an anti-wear agent. In another embodiment of the above lubricant composition in addition to the bPIBAA compound (s) or composition(s), the lubricant composition further comprises one or more of a metal detergent, friction modifier, viscosity modifier, oxidation inhibitor, and the like including an amination product of an epoxidized vinyl terminated macromonomer and an amino compound.

In another aspect of the invention, the bPIBAA compound (s) or composition are useful as emulsifiers including it use in general as an emulsion not only for the paints and coating industries but in emulsions for use in explosive applications.

Non-limiting examples of potential uses for the bPIBAA compound(s) or compositions are in the explosive emulsion formulations discussed in U.S. Pat. Nos. 4,933,028, 5,026, 442, 5,160,387, 5,670,739, 5,470,407, 6,514,361, 6,165,297 U.S. Pat. Nos. 8,603,959, 7,972,454, 5,920,031, 7,044,988, 5,936,194, 6,929,707, 6,939,420, 6,800,154, 6,951,589, 5,527,491 and 4,844,756 all of which are fully incorporated by reference in which the bPIBAA is generally substituted for the PIBSA or PIBSI utilized in the various explosive compositions or used in conjunction with PIBSA or PIBSI; and Also,). In another aspect the explosive compositions are made in accordance with any one of the methods described in the immediately above US Patents.

In one embodiment, bPIBAA compound(s) or composition are used in explosives, downhole oil applications such as fracking. In another aspect the invention is directed to an gassed emulsion explosive composition comprising in combination with the bPIBAA compound (s0 or compositions, a gasser solution comprising an inorganic nitrate (i.e., alkaline earth metal nitrites, alkali metal nitrites, and the like or combinations thereof) and/or ammonium species (i.e., ammonium chloride, ammonium nitrate, ammonium chlorate, ammonium perchlorate, and the like or combinations thereof), and optionally an accelerator (i.e., thiourea, thiocyanate, iodide, cyanate, acetate or the like), In this aspect, the gasser solution has a pH between 5 and 9 and/or the mole ratio of the inorganic nitrite to the ammonium species is 10:1 to 1:10.

In yet another aspect the invention is directed to a water-in-oil emulsion comprising a continuous oil phase and a discontinuous aqueous phase, the oil phase comprising a bPIBAA compound(s) or composition, the aqueous phase comprising a hydroxy amine. The oil-in-water emulsion in this aspect is where the hydroxy amine is diethyl-ethanol amine or any other like polyamine including cyclic or aromatic polyamines, the aqueous phase further includes an oxidizer salt such as ammonium nitrate, and optionally further comprises a sensitizing agent, i.e., microspheres.

In yet a further aspect the invention is directed to an explosive composition comprising a discontinuous oxidizer phase comprising at least one oxygen supplying component (i.e., an oxygen-supplying salt such as ammonium nitrate, ammonium chlorate, and the like), a continuous organic phase comprising at least one immiscible organic liquid (i.e., a water immiscible organic liquid such as a natural oil, an oil derived from coal or shale, or a synthetic oils including silicon base oils), and an emulsifying amount of a bPIBAA compound(s) or composition, and optionally a stabilizer, i.e., a phosphatide or an aliphatic glycol, and the like), and a sensitizing agent (i.e., a resin microsphere, or other gas containing particulate materials such as hollow glass particles).

The invention is also directed to a method for reducing friction between contacting surfaces of a mechanical device, the method further comprising lubricating the surfaces with a lubricating composition as described above. In one aspect the above mechanical device is a spark-ignited or compression ignited internal combustion engine including the mechanical device being used in any application where lubricants are used such as in automobiles, trucks, tractors, boats, bikes, trains, windmills, planes and even lawn equipment.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.
Testing Analysis and Protocol The oxirane value of the polyisobutylene epoxides (PIB epoxides) was determined using ASTM Test Method D 1652. Quantitative determination of the bis-polyisobutylene alcohol amine (bPIBAA) was based on the stoichiometry of the reagents used in combination with both $^1$H and $^{13}$C NMR. With regards to $^1$H NMR, accurate quantitative analysis of the bis-polyisobutylene alcohol amine product can be unreliable due to the existence of strong intra- and intermolecular interactions between the product molecules induced by H-bonding between secondary amine protons and the alcohol. However, by means of $^1$H NMR, the amount of unreacted polyisobutylene epoxide was determined in addition to any additional "free" unsubstituted PIB moieties. This method can also quantify the rearrangement of the polyisobutylene epoxide to the polyisobutylene vinylic alcohol with no reaction with the amine. The presence of any unreacted primary amine can be determined by $^{13}$C NMR peaks assigned to the $CH_2$ group adjacent to the primary amine. Any unreacted primary amines may indicate the presence of either a mono-polyisobutylene alcohol amine or amines that have not participated within the reaction. The molecular weight increase associated with the formation of the bis-polyisobutylene alcohol amine is reflected in the product viscosity and GPC chromatographs as provided in Table 1.

Products were characterized by $^1$H NMR and $^{13}$C NMR as follows: NMR spectra were recorded on a Bruker 600 MHz Neo Digital NMR Spectrometer at ambient temperature. All chemical shifts were referenced to tetramethylsilane (TMS) as external standard and referenced to the residual proton and carbon signals of $CDCl_3$ solvent at $\delta_H$ 7.24 ppm and $\delta_C$ 77.0 ppm, respectively. Samples were prepared with 60-100 mg in 0.5 mL of $CDCl_3$ (Sigma Aldrich). Spectra were analyzed by Fourier transform, with phase and baseline corrected by Bruker TopSpin (version 4.0.7) automated routines. Manual integration and selected peak normalization of the integrals by desired peak was applied to all spectra. The integration regions were spread over a range of at least 25 times of the line width (Hz) of the peak in both directions, and the data derived from the peak integration was taken as an average of three separate manual measurements to minimize experimental uncertainty.

Comparative Example A—PIBSI

In a 300 ml stainless steel stirred pressure vessel, 7.08 g of Ethyleneamine E-100 amine and 300 g PIBSA (0.061 moles) having a number average molecular weight Mn of 2300 is mixed with 102.4 grams of toluene. This translates to 0.024 moles of Ethyleneamine E-100 (Huntsman, The Woodlands, TX) giving a mole ratio of 0.43:1 (amine: PIBSA). The reactants were heated to 190° C. under a nitrogen atmosphere for 42 hours forming a PIBSI product with a Mn of 4861 and having a viscosity at 100° C. is of 9216 cSt. The toluene was removed from the product by vacuum.

Comparative Example 1

Polyisobutylene epoxide (PIBEP) was synthesized from PIB 545 available from the TPC Group, Houston Texas. In a 300 ml stainless steel stirred pressure vessel, 60 g of the polyisobutylene epoxide (PIBEP) having a number average molecular weight Mn of 450 and an oxirane oxygen value of 1.56% is mixed with 0.147 moles of triethylenetetramine (TETA) at a mole ratio of 2:1 (amine:PIBEP) and heated to 190° C. under a nitrogen atmosphere for 12 hours. The mixture was cooled to 150° C. An additional 60 g of the same PIBEP was added to the reaction mixture. Final reaction mixture had an amine:PIBEP of 1:1. The reactor was then heated to 250° C. under a nitrogen atmosphere for an additional 12 hours. The reaction pressure began at atmospheric pressure, and as the reaction was heated, autogenous pressure resulted. Mass grams of constituents employed: TETA (amine)=21.45 g and PIBEP=60 g.

There was a near complete conversion of the PIBEP (no epoxide detected in the $^1$H NMR), however PIBEP is the limiting reagent to the reaction. Approximately 54% of the TETA was unreacted and the reaction produced a predominately mono-polyisobutylene alcohol amine product as illustrated by a large $CH_2$ (adjacent to the primary amine) peak in the $^{13}$C NMR. Mn of the mono-polyisobutylene alcohol amine product was found to be 657 based on a polystyrene standard.

Comparative Example 2

Comparative Example 1 above was reproduced with the following exceptions: mass grams of amine=14.62 g and PIBEP=100 g. Temperature was raised and maintained throughout the reaction at 250° C. The catalyst employed was $BF_3$ at 0.10 g and methanol at 0.61 g. The TETA:PIBEP mole ratio was 0.8:1 with final mono amine product obtained having an Mn of 704 based on a polystyrene standard.

In a 300 ml stainless steel stirred pressure vessel, 100 g of polyisobutylene epoxide (PIBEP) of Comparative Example 1 is mixed with 0.100 moles of triethylenetetramine (TETA) at a mole ratio of 0.8:1 (amine:PIBEP) and 0.1 g of 14% boron trifluoride catalyst in methanol as the protic solvent initiator was employed. The reactants were heated to 250° C. under a nitrogen atmosphere for 12 hours.

There was a near complete conversion of the PIBEP (no epoxide detected in the $^1$H NMR), however PIBEP is the limiting reagent to the reaction. Approximately 2 mol % of the TETA was unreacted on account of the lower mole ratio of TETA in comparison to Comparative Example 1. The reaction produced a mixture of predominately mono-polyisobutylene alcohol amine product and bPIBAA as illustrated by a large $CH_2$ (adjacent to the primary amine) peak in the $^{13}$C NMR.

Example 3

Comparative Example 1 was reproduced with the following exceptions: mass grams of amine=8.20 g, PIBEP=100 g. Temperature was raised and maintained throughout the reaction at 250° C. The catalyst employed was $BF_3$ at 0.10 g and methanol at 0.61 g. 13.8 g toluene was employed as diluent. The amine:PIBEP mole ratio was 0.45:1, with final bis-polyisobutylene alcohol amine product, the bPIBAA of the invention, obtained having an Mn 729 based on a polystyrene standard.

In a 300 ml stainless steel stirred pressure vessel, 100 g of polyisobutylene epoxide (PIBEP) having a number average molecular weight Mn of 450 and an oxirane oxygen value of 1.56% is mixed with 0.056 moles of triethylenetetramine (TETA) at a mole ratio of 0.45:1 (amine:PIBEP), 0.1 g of 14% boron trifluoride catalyst in methanol, and 13.8 g of toluene. The reactants were heated to 250° C. under a nitrogen atmosphere for 24 hours. The toluene was removed from the product by vacuum.

There was a near complete conversion of the PIBEP (no epoxide detected in the $^1$H NMR), however TETA is the limiting reagent to the reaction this time with a slight excess of PIBEP. Toluene was added to reduce the viscosity of the reaction mixture to facilitate the reaction. The reaction produced a predominately bis-polyisobutylene alcohol amine product, the bPIBAA of the invention, as illustrated by the absence of $CH_2$ (adjacent to the primary amine) peaks in the $^{13}$C NMR and a significant increase in the viscosity comparative to the starting PIBEP. Table 1 below shows the viscosity and GPC Mn behavior of this reaction product.

Example 4

Comparative Example 1 was reproduced with the following exceptions: PIBEP 595 from the TPC Group, Houston TX was employed for preparation of the epoxide; mass grams of amine=3.44 g, PIBEP=100 g. Temperature was raised and maintained throughout the reaction at 220° C. The catalyst employed was $BF_3$ at 0.10 g and methanol at 0.61 g. 18.4 g of toluene was employed as diluent. The amine:PIBEP ratio was 0.45:1, with final bis-polyisobutylene alcohol amine product, the bPIBAA of the invention, obtained having an Mn 1517 based on a polystyrene standard.

In a 300 ml stainless steel stirred pressure vessel, 100 g of polyisobutylene epoxide (PIBEP) having a number average molecular weight Mn of 950 and an oxirane oxygen value of 0.82% is mixed with 0.023 moles of triethylenetetramine (TETA) at a mole ratio of 0.45:1 (amine:PIBEP), 0.1 g of 14% boron trifluoride in methanol, and 18.4 g of toluene. The reactants were heated to 220° C. under a nitrogen atmosphere for 42 hours. The toluene was removed from the product by vacuum. The Table below shows the viscosity behavior of this reaction product.

There was a near complete conversion of the higher 950 number average molecular weight) PIBEP (no epoxide detected in the $^1$H NMR), however TETA is the limiting reagent to the reaction with a slight excess of PIBEP. Toluene was added to reduce the viscosity of the reaction mixture to facilitate the reaction. The reaction produced a predominately bis-polyisobutylene alcohol amine product, bPIBAA of the invention, as illustrated by the absence of $CH_2$ (adjacent to the primary amine) peaks in the $^{13}$C NMR and a significant increase in the viscosity comparative to the starting PIBEP. The Table below shows the viscosity and GPC Mn behavior of this reaction product.

Example 5

Comparative Example 1 was reproduced with the following exceptions: PIBEP 545 from the TPC Group, Houston TX was employed for preparation of the epoxide; mass grams of amine=3.44 g and PIBEP=100 g. Temperature was raised and maintained throughout the reaction at 220° C. No catalyst was used in this Example 6a. 18.4 g of toluene was employed as diluent. The amine:PIBEP ratio was 0.19:1, with final bis-polyisobutylene alcohol amine product, the bPIBAA of the invention, obtained having an Mn 712 based on a polystyrene standard.

In a 300 ml stainless steel stirred pressure vessel, 100 g of polyisobutylene epoxide (PIBEP) having a number average molecular weight Mn of 450 and an oxirane oxygen value of 1.56% is mixed with 0.023 moles of triethylenetetramine (TETA) at a mole ratio of 0.2:1 (amine:PIBEP), and 18.4 g of toluene. The reactants were heated to 220° C. under a nitrogen atmosphere for 42 hours. The toluene was removed from the product by vacuum. The Table below shows the viscosity behavior of this reaction product.

The conversion of the PIBEP to the inventive bis-polyisobutylene alcohol amine product, bPIBAA, is approximately 20% (as determined by $^1$H NMR). TETA, the polyamine is the limiting reagent to the reaction with a large excess of PIBEP. Toluene was added to reduce the viscosity of the reaction mixture to facilitate the reaction. There was no $BF_3$·methanol catalyst used for this reaction demonstrating that the reaction can be achieved in the absence of a catalyst. The reaction produced a predominately bis-polyisobutylene alcohol amine product, the bPIBAA of the invention, as illustrated by the absence of $CH_2$ (adjacent to the primary amine) peaks in the $^{13}$C NMR and an increase in the viscosity comparative to the starting PIBEP. The Table below shows the viscosity and GPC Mn behavior of this reaction product.

This Example 5 illustrates that the polyamine is quantitatively consumed based on using a sub-stoichiometric quantity even in the absence of catalyst as the reaction yielded the desired bPIBAA product in a mixture also containing excess unreacted PIBEP.

Example 6

Comparative Example 1 was reproduced with the following exceptions: PIBEP 595 from the TPC Group, Houston TX was employed for preparation of the epoxide; mass grams of Ethylenamine E-100 amine=6.37 g, PIBEP=100 g. Temperature was raised and maintained throughout the reaction at 220° C. The catalyst employed was $BF_3$ at 0.10 g and methanol at 0.61 g. 18.4 g of toluene was employed as diluent. The amine:PIBEP mole ratio was 0.45:1, with final bis-polyisobutylene alcohol amine product, the bPIBAA of the invention, obtained having an Mn 1507 based on a polystyrene standard.

In a 300 ml stainless steel stirred pressure vessel, 100 g of polyisobutylene epoxide (PIBEP) having a number average molecular weight Mn of 950 and an oxirane oxygen value of 0.82% is mixed with 0.024 moles of Ethyleneamine E-100 (available from Huntsman, The Woodlands, TX) at a mole ratio of 0.45:1 (amine:PIBEP), 0.1 g of 14% boron trifluoride in methanol catalyst is used, and 18.4 g of toluene. The reactants were heated to 220° C. under a nitrogen atmosphere for 42 hours. The toluene was removed from the product by vacuum. The Table below shows the viscosity behavior of this reaction product.

There was a near complete conversion of the PIBEP (no epoxide detected in the $^1$H NMR), however Ethyleneamine E-100 is the limiting reagent to the reaction with a very slight excess of PIBEP. Toluene was added to reduce the viscosity of the reaction mixture to facilitate the reaction. The reaction produced a predominately bis-polyisobutylene alcohol amine product, bPIBAA of the invention, as illustrated by the absence of $CH_2$ (adjacent to the primary amine) peaks in the $^{13}$C NMR and a significant increase in the viscosity comparative to the starting PIBEP. The Table below shows the viscosity and GPC Mn behavior of this reaction product.

Examples 7 and 8

In a 600 ml stainless steel stirred pressure vessel, 300 g of polyisobutylene epoxide (PIBEP) originating from PIB 5230 as obtained from the TPC Group, Houston TX, and having a number average molecular weight Mn of 2300 and an oxirane oxygen value of 0.32% is mixed with 0.028 moles of Ethyleneamine E-100 (Huntsman, The Woodlands, TX) at a mole ratio of 0.43:1 (amine:PIBEP), 0.3 g of 14% boron trifluoride in methanol catalyst, and 103 g of toluene. The reactants were heated to 220° C. under a nitrogen atmosphere for 42 hours. The toluene was removed from the product by vacuum. The Table below shows the viscosity behavior of these reaction products.

The conversion of PIBEP to the inventive bis-polyisobutylene alcohol amine product, the bPIBAA product of the invention in Example 8 was greater than 80% (as determined by $^1$H NMR) for these examples. However, in Example 7 it is believed that in this case the polyamine used was less than targeted as determined based on presence of unreacted epoxide in the $^{13}$C NMR. The Ethyleneamine E-100 amine is the limiting reagent to the reaction with an excess of PIBEP. Toluene was added to reduce the viscosity of the reaction mixture to facilitate the reaction. The reaction produced a predominately bPIBAA product as illustrated by the absence of $CH_2$ (adjacent to the primary amine) peaks in the $^{13}$C NMR and an increase in the viscosity comparative to the starting PIBEP. The Table below shows the viscosity and GPC Mn behavior of this reaction product. There is an increase in PIB vinylic alcohol formation from epoxide ring opening (likely from excess epoxide). The desired bis-polyisobutylene alcohol amine product obtained had an Mn of 3016 and 3030 based on a polystyrene standard.

Example 9

In a 600 ml stainless steel stirred pressure vessel, 300 g of polyisobutylene epoxide (PIBEP) originating from PIB 595 obtained from the TPC Group of Houston, TX, having a number average molecular weight Mn of 950 and an oxirane oxygen value of 0.82% is mixed with 0.071 moles of Ethyleneamine E-100 (Huntsman, The Woodlands, TX) at a mole ratio of 0.43:1 (amine:PIBEP), 0.3 g of 14% boron trifluoride in methanol catalyst was used, and 56.7 g of toluene. The reactants were heated to 220° C. under a nitrogen atmosphere for 42 hours. The toluene was removed from the product by vacuum. The Table below shows the viscosity behavior of this reaction product.

There was a near complete conversion of the PIBEP (no epoxide detected in the $^1$H NMR), however Ethyleneamine E-100 is the limiting reagent to the reaction with a very slight excess of PIBEP. Toluene was added to reduce the viscosity of the reaction mixture to facilitate the reaction. The reaction produced a predominately bis-polyisobutylene alcohol amine product, the bPIBAA product of the invention, as illustrated by the absence of $CH_2$ (adjacent to the primary amine) peaks in the $^{13}$C NMR and a significant increase in the viscosity comparative to the starting PIBEP. The Table below shows the viscosity and GPC Mn behavior of this reaction product. This Example 9 was performed at an approximate 3× larger scale than that used in Example 6. The desired bis-polyisobutylene alcohol amine product, the bPIBAA of the invention, obtained had an Mn of 1513 based on a polystyrene standard, and reproduced well as compared to the bPIBAA product of Example 7 having an Mn of 1507.

TABLE 1

Viscosity and GPC Mn behavior for reaction products.

|  | Kinematic Viscosity @ 100° C. | Mn, GPC | Yield bPIBAA |
|---|---|---|---|
| 450 Mn PIB Epoxide Reactions |  |  |  |
| 450 Mn PIB Epoxide | 15.4 | 507 |  |
| Example 3 | 38.4 | 729 | 64.97% |
| Example 5 | 36.01 | 712 | 9.91% |
| 950 Mn PIB Epoxide Reactions |  |  |  |
| 950 Mn PIB Epoxide | 186 | 977 |  |
| Example 4 | 386 | 1517 | 95.78% |
| Example 6 | 335 | 1507 | 96.24% |
| Example 9 (larger scale of Ex. 6) | 609 | 1513 | 96.24% |
| 2300 Mn PIB Epoxide Reactions |  |  |  |
| 2300 Mn PIB Epoxide | 1646 | 2290 |  |
| Example 7 | 2837 | 3016 | 56.47% |
| Example 8 (repeat of Ex. 7) | 2697 | 3030 | 82.65% |

It was found that the reaction forming the desired bPIBAA product was driven to completion on a primary amine basis when the mole ratio of primary amine/PIBEP is less than or equal to 1, preferably when employed together with toluene (or other suitable diluent) as diluent and a reaction temperature not to exceed 260° C.

It is observed in Example 3, that the desired bPIBAA product reaction was driven to completion by use of stoichiometric amount of amine. Example 6 illustrates the use of Ethyleneamine E-100 where this polyamine is a mixture with longer chains.

FIG. 1

FIG. 1 is a GPC characterization of bPIBAA on a logarithmic scale. GPC was determined as follows: GPC calibrated to the polyisobutylene standard.

The GPC shows a comparison between the polyisobutylene 5230 from which the polyisobutylene epoxide used in making the bPIBAA in Example 7 of the invention. From the GPC it can be seen that there is an expected shift to a higher molecular weight indicating the formation of bPIBAA.

FIG. 2

Figure 2:
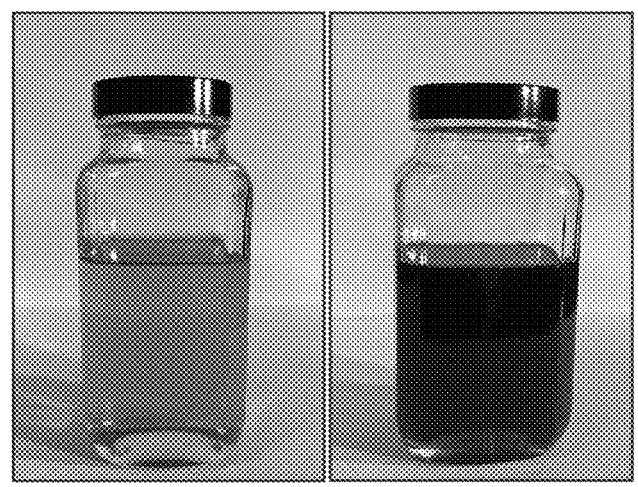
FIG. 2 illustrates a visual comparison of color of bPIBAA versus PIBSI.

FIG. 2 is visual comparison of color of bPIBAA from Example 7 in versus a typical PIBSI from Comparative Example A made from a base PIB having the same Mn, nominally 2300. The bPIBAA composition of the invention has improved color compared to PIBSI minimal haze/sediment during the reaction, the final product has no or predominantly no unsaturation which eliminates the allylic hydrogens present in PIBSI.

The color for the bPIBAA compound(s) or composition of Example 7 as seen in FIG. 2 has a color of 1.5 (neat) ASTM color unit based on ASTM D-1500 ASTM of Color Petroleum Products (ASTM color scale) (the values with less than 0.5 indicating less color versus 8 where the color is very dark), and the Haze was 7.78NTU based on ASTM D-6181 Standard Test Method for Measurement of Turbidity in Mineral Insulating Oil of Petroleum Origin (NTU is nephelometric turbidity unit which goes from 0 to 500, where 0 is clear and 500 extremely turbid oil). For the comparison PIBSI compound or composition of Comparative Example A as seen in FIG. 2 had a color of 3 (dilute) ASTM color unit and a haze of 20.4 NTU. For reference standard polyisobutylene has a color of less than 0.5 ASTM color unit (virtually colorless) and a haze of less than 4 NTU.

The improvement in color is significant and would have advantages in quality believed to be a result of not having residual maleic anhydride in the formation of PIBSA. In one embodiment, the bPIBAA composition or compound(s) of the invention has a haze as measured by ASTM D-6181 of less than 20 NTU, preferably less than 15 NTU, more preferably less than 10 NTU or within the range of 0.5 NTU to 15 NTU, preferably within the range of from 2NTU to 8NTU. In another embodiment, alone or in combination with the above values for haze, the color of bPIBAA composition or compound(s) as measured by ASTM-1500 is less than 3.5 ASTM color unit, preferably less than 3 ASTM color units, and more preferably less than 2 ASTM color units, in the range of from 1 to 3 ASTM color units, preferably in the range of from 1 to 2 ASTM color units.

FIG. 3

Figure 3:
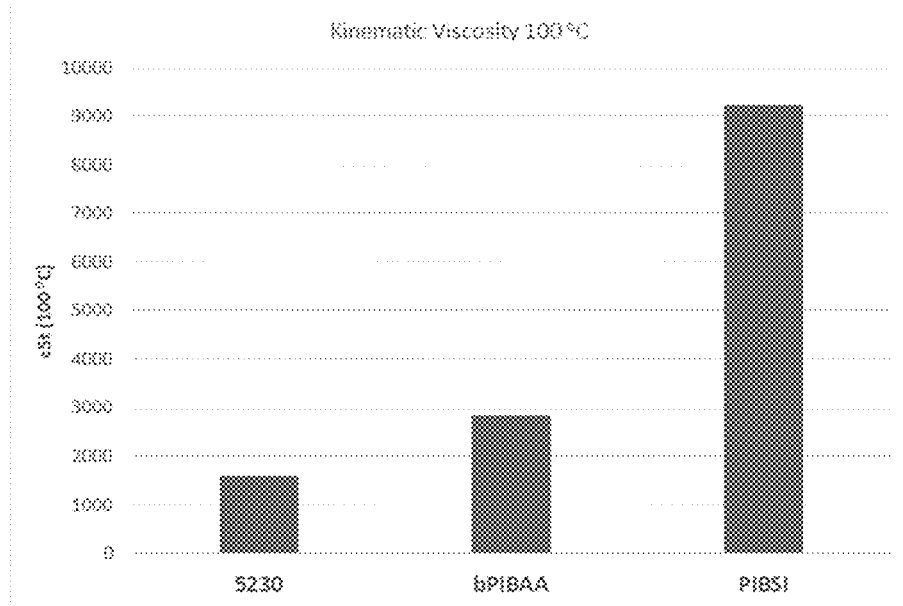
FIG. 3 illustrates the Kinematic Viscosity using ASTM D-445 at 100° C. of PIBSI versus bPIBAA (KV100)

FIG. 3 is a graph showing the Kinematic Viscosity (KV100) as measured in accordance with ASTM D-445 at 100° C. The graph shows a comparison between the polyisobutylene from which the polyisobutylene epoxide used in making the bPIBAA of Example 7 and that of Comparative Example A. Lower viscosity oils can lead to lower fuel consumption and thus reduced $CO_2$ emissions, therefore having a dispersant additive that has a low initial viscosity and more oxidatively stable so that the change in viscosity when in use is minimized would be highly desirable.

The process of the invention yields the new bPIBAA compound or composition that avoids the undesired reactivity that typically leads to dimerization in the production and use of PIBSI. It has been surprisingly found that the bPIBAA composition of this invention has a significantly lower viscosity (KV100) as compared to viscosity of a similar PIBSI component. The graph further illustrates another indication that bPIBAA is formed as a result of the approximate doubling of the viscosity.

FIG. 4

It has also been surprisingly found that a lubricating oil composition containing the bPIBAA has significantly better oxidation resistance to a similar composition containing PIBSA using the test protocol CEC L-48-00, a standard test well known in the art. This was accomplished by testing two lubricant formulations, one containing 20% by weight bPIBAA (from Example 7) and the second 20% by weight PIBSI (from Comparative Example A) using RB PAO 4 (from RB Products, Inc., Scottsville, TX) as the base oil, to form the oil formulation.

Figure 4:
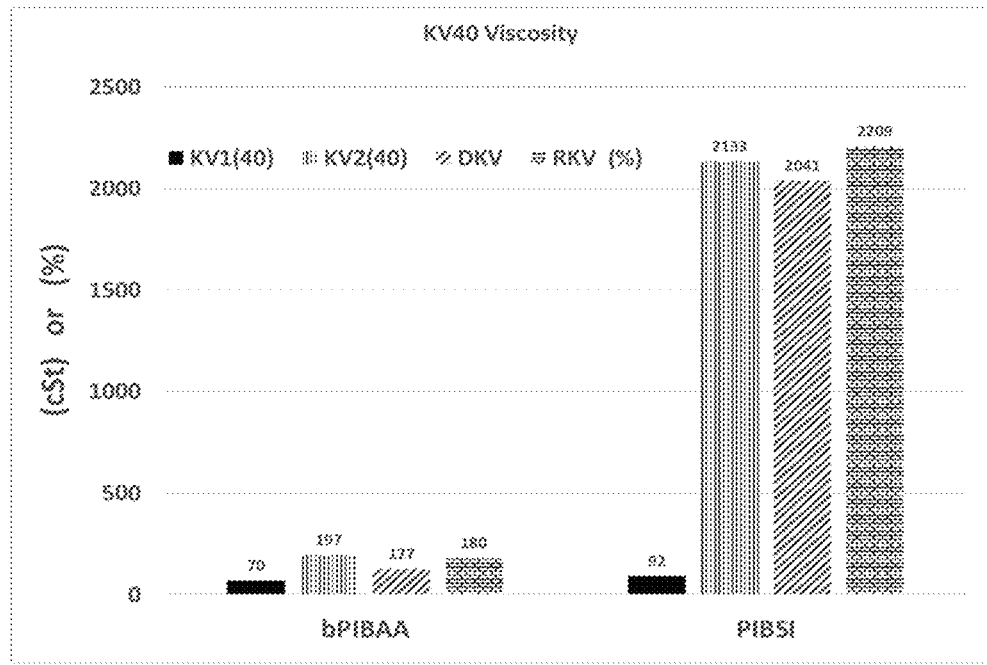
FIG. 4 illustrates the Oxidation Test results using CEC-L48 showing a comparison of Kinematic Viscosity at 40° C. of PIBSI versus bPIBAA (KV40).

These results of the oxidation testing are provided in FIG. 4 where KV1 (40) is the kinematic viscosity of the fresh, unoxidized oil formulation at 40° C. KV2 (40) is the kinematic viscosity at 40° C. of the oil formulation that was oxidized oil where the formulations were heated to 17° C. and aerated for 192 hours. DKV is the difference or the increase in viscosity at 40° C. of the oxidized oil formulation versus the fresh oil formulations. Finally, RKV (%) is the percentage increase comparing the kinematic viscosity of the oxidized oil formulation to the fresh oil formulation.

The results depicted in FIG. 4 demonstrate a significant improvement in oxidation resistance for bPIBAA containing oil compared to PIBSI in the same oil formulation. After subjecting bPIBAA oil formulation of the invention and PIBSI oil formulation to the rigorous protocol described in CEC L-48-00, the bPIBAA oil formulation KV(40) increased by only 127 cSt compared to 2041 cSt for the PIBSI oil formulation. That represents an order of magnitude improvement 180% versus 2209% change in viscosity for bPIBAA oil formulation versus PIBSI oil formulation, this was unexpected. The KV1(40) for the 20% solution of bPIBAA and PIBSI are 70 cSt and 92 cSt respectively.

The present invention has been described herein with reference to a particular embodiment for a particular application. Although selected embodiments have been illustrated and described in detail, it may be understood that various substitutions and alterations are possible. It is possible that the process could be extended to other chemistries such as direct reaction of polyisobutylene epoxide with an alcohol or polyol, such as polyethylene oxide. Those having ordinary skill in the art and access to the present teachings may recognize additional various substitutions and alterations are also possible without departing from the spirit and scope of the present invention, and as defined by the following claims.

What is claimed is:

1. A bis-polyisobutylene alcohol amine compound(s) comprising the following general formula:

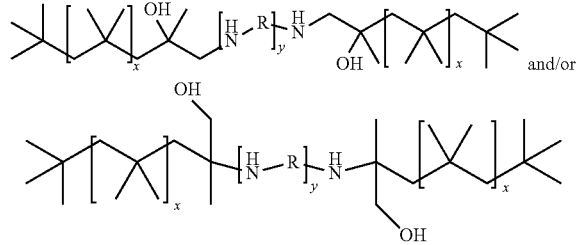

wherein x is an integer from 1 to about 200, R is a $C_1$-$C_{10}$ branched, cyclic or straight chained alkylene group, and y is an integer between 1 to about 20.

2. The bis-polyisobutylene alcohol amine compound(s) of claim 1 wherein x is 100 and y is an integer from 1 to 10.

3. The bis-polyisobutylene alcohol amine compound(s) of claim 1 wherein x is 50 and y is an integer from 2 to 10.

4. The bis-polyisobutylene alcohol amine compound(s) of claim 1 wherein x is an integer from 1 to about 150 and y is an integer from 1 to about 20.

5. The bis-polyisobutylene alcohol amine compound(s) of claim 1 wherein x is 100, R is ethylene, and y is an integer from 1 to 10.

6. The bis-polyisobutylene alcohol amine compound(s) of claim 1 wherein x is 50, R is ethylene and y is an integer from 2 to 10.

7. The bis-polyisobutylene alcohol amine compound(s) of claim 1 wherein the bis-polyisobutylene alcohol amine compound(s) comprises an Mn in the range of from 800 to 10,000.

8. The bis-polyisobutylene alcohol amine compound(s) of claim 1 wherein the bis-polyisobutylene alcohol amine compound(s) comprises a PDI in the range of from 1.2 to 5.

9. The bis-polyisobutylene alcohol amine compound(s) of claim 1 wherein the bis-polyisobutylene alcohol amine compound(s) comprises a viscosity in the range of from 10 cSt to 10,000 cSt.

10. The bis-polyisobutylene alcohol amine compound(s) of claim 1 wherein the bis-polyisobutylene alcohol amine compound(s) comprises an Mn in the range of from 800 to 6000, a PDI in the range of from 1.2 to 3, and a viscosity in the range of from 25 cSt to 5000 cSt.

11. A bis-polyisobutylene alcohol amine composition, the composition comprising a bis-polyisobutylene alcohol amine compound(s) further comprising the following general formula:

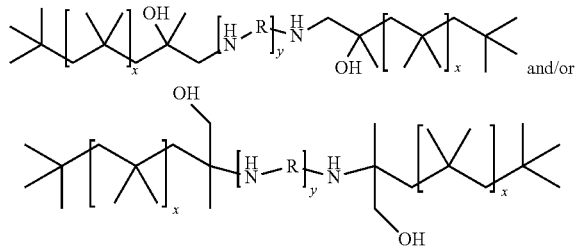

and/or

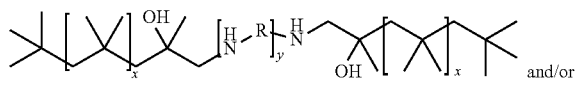

wherein x is an integer from 1 to about 200, R is a $C_1$-$C_{10}$ branched, cyclic or straight chained alkylene group, and y is an integer between 1 to about 20.

12. The bis-polyisobutylene alcohol amine composition of claim 11 wherein x is 90 to 110 and y is an integer from 1 to 10.

13. The bis-polyisobutylene alcohol amine composition of claim 11 wherein x is 40 to 60 and y is an integer from 2 to 10.

14. The bis-polyisobutylene alcohol amine composition of claim 11 wherein x is 100, R is ethylene, and y is an integer from 1 to 10.

15. The bis-polyisobutylene alcohol amine composition of claim 11 wherein x is 50, R is ethylene and y is an integer from 2 to 10.

16. The bis-polyisobutylene alcohol amine composition of claim 11 wherein the composition comprises an Mn in the range of from 800 to 6000, a PDI in the range of from 1.2 to 3, and a viscosity in the range of from 25 cSt to 5000 cSt.

17. The bis-polyisobutylene alcohol amine composition of claim 11, wherein the composition comprises greater than 50 mol % of one or more of the bis-polyisobutylene alcohol amine compound(s).

18. The bis-polyisobutylene alcohol amine composition of claim 11, wherein the composition comprises greater than 70 mol % of one or more of the bis-polyisobutylene alcohol amine compound(s).

19. The bis-polyisobutylene alcohol amine composition of claim 11, wherein the composition comprises greater than 80 mol % of one or more of the bis-polyisobutylene alcohol amine compound(s).

20. The bis-polyisobutylene alcohol amine composition of claim 11, wherein the composition comprises greater than 90 mol % of one or more of the bis-polyisobutylene alcohol amine compound(s).

21. A bis-polyisobutylene alcohol amine composition comprising: (i) 5 mol % to 98 mol % of one or more bis-polyisobutylene alcohol amine compound(s), (ii) up to 15 mol % of unreacted polyisobutylene, and (iii) up to 15 mol % of one or more unreacted polyisobutylene epoxide, wherein the sum of the mol % of i, ii and iii together add to between 98 mol % and 100 mol %.

22. The bis-polyisobutylene alcohol amine composition of claim 21 wherein the one or more bis-polyisobutylene alcohol amine compound(s) comprises the following general formula:

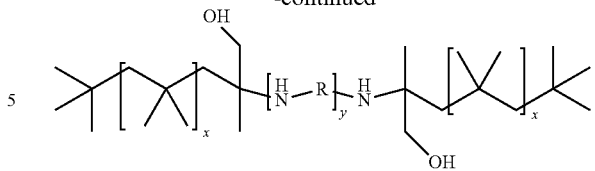

and/or

-continued

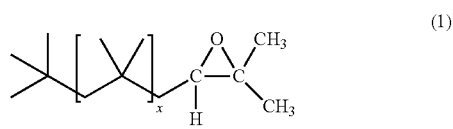

wherein x is an integer from 1 to about 200, R is a $C_1$-$C_{10}$ branched, cyclic or straight chained alkylene group, and y is an integer between 1 to about 20.

23. The bis-polyisobutylene alcohol amine composition of claim 21 wherein the one or more of the unreacted polyisobutylene epoxide comprises one or more of the formula:

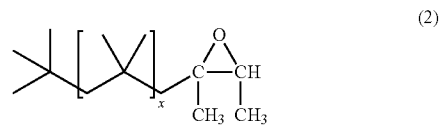

(1)

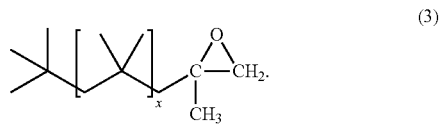

(2)

(3)

wherein x is an integer from 1 to about 200, preferably 1 to about 150 and most preferably between 1 to 100.

24. The bis-polyisobutylene alcohol amine composition of claim 21 wherein the composition comprises an Mn in the range of from 800 to 6000, a PDI in the range of from 1.2 to 3, and a viscosity in the range of from 25 cSt to 5000 cSt.

25. The bis-polyisobutylene alcohol amine composition of claim 22, wherein the composition comprises greater than 80% of one or more of the bis-polyisobutylene alcohol amine compound(s).

26. The bis-polyisobutylene alcohol amine composition of claim 22, wherein the composition comprises greater than 90 mol % of one or more of the bis-polyisobutylene alcohol amine compound(s).

27. The bis-polyisobutylene alcohol amine composition of claim 21 wherein the composition further comprises (iv) a mono poly-isobutyl alcohol amine in an amount less than 1 mol %, wherein the sum of the mol % of i, ii, iii and iv together add to 100 mol %.

28. The bis-polyisobutylene alcohol amine composition of claim 21 wherein the composition comprises a PDI in the range of from 1.2 to 5.

29. The bis-polyisobutylene alcohol amine composition of claim 21 wherein the bis-polyisobutylene alcohol amine compound(s) comprises an Mn in the range of from 800 to 6000, a PDI in the range of from 1.2 to 3, and a viscosity in the range of from 25 cSt to 5000 cSt.

30. A bis-polyisobutylene alcohol amine compound.

31. A bis-polyisobutylene alcohol amine compound produced by the process comprising the step of: contacting in a reactor under reaction conditions a polyisobutylene epoxide and a polyamine in a mole ratio of polyamine to polyisobutylene epoxide of less than 0.9:1.

32. The bis-polyisobutylene alcohol amine compound produced by the process of claim 31 wherein the mole ratio of polyamine to polyisobutylene epoxide of less than 0.7:1.

33. The bis-polyisobutylene alcohol amine compound produced by the process of claim 31 wherein the mole ratio of polyamine to polyisobutylene epoxide comprises less than 0.5:1.

34. The bis-polyisobutylene alcohol amine compound produced by the process of claim 31 wherein the polyamine comprises the general formula:

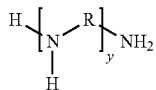

R is a $C_1$-$C_{10}$ branched, cyclic or straight chained alkylene group (or a combination of), and y is an integer between 1 to 20.

35. The bis-polyisobutylene alcohol amine compound produced by the process of claim 31 wherein the polyisobutylene epoxide is a mixture of a Type 1, 2 and/or 3 polyisobutylene epoxide as represented below:

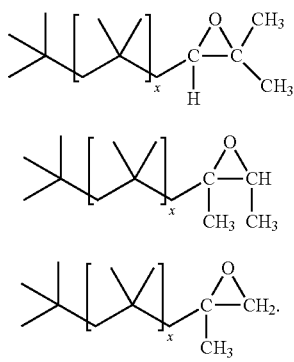

36. The bis-polyisobutylene alcohol amine compound produced by the process of claim 35, wherein the polyisobutylene epoxide comprises a predominantly Type 3 polyisobutylene epoxide.

37. The bis-polyisobutylene alcohol amine compound produced by the process of claim 31, wherein the process further comprises the step of: introducing a diluent to the reactor.

38. The bis-polyisobutylene alcohol amine compound produced by the process of claim 31, wherein the process further comprises the step of: introducing a diluent, a catalyst and a protic solvent initiator to the reactor.

39. The bis-polyisobutylene alcohol amine compound produced by the process of claim 31, wherein the temperature is from about 60° C. to about 260° C.

40. A process for making a bis-polyisobutylene alcohol amine composition, the process comprising the steps of: (i) contacting a polyisobutylene epoxide with a polyamine in the presence of a diluent forming a reaction mixture; and (ii) introducing a catalyst and a protic solvent initiator to the reaction mixture, wherein the mole ratio of polyamine to polyisobutylene epoxide is less than 0.7:1.

41. The process of claim 40 wherein the mole ratio of polyamine to polyisobutylene epoxide is less than 0.6:1.

42. The process of claim 40 wherein the polyisobutylene epoxide is a Type 1, Type 2, and/or Type 3 polyisobutylene epoxide as represented below:

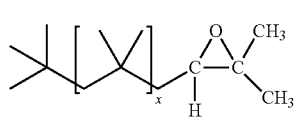

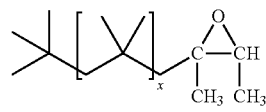

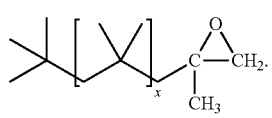

43. The process of claim 42 wherein the polyisobutylene epoxide is predominantly Type 3.

44. The process of claim 40 wherein the polyisobutylene epoxide comprises an Mn of from 400 to 5000 and an oxirane oxygen value of 2% to 0.15%.

45. The process of claim 40 wherein the polyisobutylene epoxide comprises an Mn of from 400 to 3000 and an oxirane oxygen value of 2% to 0.25%.

46. The process of claim 40 wherein the polyisobutylene epoxide comprises an epoxidated highly reactive polyisobutylene having between 60 mol % to 90 mol % alpha-vinylidene isobutylene isomer content.

47. The process of claim 46 wherein the highly reactive polyisobutylene comprises an Mn in the range of from 400 to 5000.

48. The process of claim 47 wherein the bis-polyisobutylene alcohol amine composition comprises an Mn in the range of 800 to 10,000.

49. The process of claim 40 wherein the polyamine comprises the general formula:

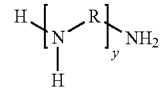

wherein R is a $C_1$-$C_{10}$ branched, cyclic or straight chained alkylene group (or a combination of), and y is an integer between 1 to 20.

50. A lubricating composition comprising a bis-polyisobutylene alcohol amine compound(s) and/or composition.

51. A lubricating composition comprising a base oil and a bis-polyisobutylene alcohol amine composition.

52. The lubricating composition of claim 51 wherein the bis-polyisobutylene alcohol amine composition comprises an Mn in the range of from 800 to 6000, a PDI in the range of from 1.2 to 3, and a viscosity in the range of from 25 cSt to 5000 cSt.

53. A method of lubricating an internal combustion engine comprising supplying to the internal combustion engine the lubricating composition of claim 51.

54. A method to stabilize the oxidation of a crankcase lubricant as measured by CEC L-48-00, wherein the method comprises lubricating the crankcase with the lubricating composition of claim 51.

55. The lubricating composition of claim 51 wherein the lubricating composition comprises less than a 500% increase as between the KV40(1) and KV40(2) of the lubricating composition using the measuring standard in accordance with CEC L-48-00.

56. The lubricating composition of claim 51 wherein the lubricating composition comprises from 1 weight percent to 30 weight percent of a base oil selected from one or more of a Group I, II, III, IV or V as defined by the American Petroleum Institute in 2023.

57. The lubricating composition of claim 51 wherein the lubricating composition further comprises two or more of a base oil, an ashless dispersant, an antioxidant, a detergent, oxidation inhibitor, and an anti-wear agent.

58. A method for reducing friction between contacting surfaces of a mechanical device, the method further comprising lubricating the surfaces with a lubricating composition of claim 51.

59. The method of claim 58 wherein the mechanical device is a spark-ignited or compression ignited internal combustion engine.

60. A combustible composition for cleaning a fuel delivery system, intake systems and combustion chambers, wherein the combustible composition comprises the compound of claim 50 in an amount up to 40 weight percent based on the total weight of the combustible composition.

61. The composition of claim 51 for use in adhesive, sealants, greases, emulsifiers, paints and coatings, and polymer formulations.

62. A gassed emulsion explosive composition comprising a bis-polyisobutylene alcohol amine compound(s) and/or compositions of claim 50, and a gasser solution comprising an inorganic nitrate and an ammonium species.

63. The gassed emulsion explosive composition of claim 62, further comprising an accelerator and/or a sensitizing agent.

64. A water-in-oil emulsion comprising a continuous oil phase and a discontinuous aqueous phase, the continuous oil phase comprising a bis-polyisobutylene alcohol amine compound(s) and/or composition of claim 50 and the aqueous phase comprising a hydroxy amine.

65. An emulsion explosive composition comprising a discontinuous oxidizer phase comprising at least one oxygen supplying component, a continuous organic phase comprising at least one immiscible organic, an emulsifying amount of a bis-polyisobutylene alcohol amine compound(s) and/or composition of claim 50.

66. The emulsion explosive composition of claim 65, further comprising a stabilizer and a sensitizing agent.

* * * * *